United States Patent [19]

Jacoby

[11] 4,334,521

[45] Jun. 15, 1982

[54] SOLAR ENERGY SYSTEM

[75] Inventor: Walter Jacoby, Toms River, N.J.

[73] Assignee: Solar Optimizing Systems, Inc., Toms River, N.J.

[21] Appl. No.: 875,176

[22] Filed: Feb. 6, 1978

[51] Int. Cl.³ .................................. F24J 3/02
[52] U.S. Cl. .................................. 126/425; 126/418; 126/420; 318/663
[58] Field of Search ............... 237/1 A; 126/270, 271, 126/438, 418, 422, 424, 419, 425, 420; 250/203, 393; 353/3; 318/663

[56] References Cited

U.S. PATENT DOCUMENTS

| | | | |
|---|---|---|---|
| 4,027,653 | 6/1977 | Meckler | 126/270 |
| 4,041,307 | 8/1977 | Napoli et al. | 126/270 |
| 4,044,754 | 8/1977 | Cronin et al. | 137/59 |
| 4,079,249 | 3/1978 | Glynn | 250/203 R |
| 4,089,323 | 5/1978 | Trihey | 126/271 X |
| 4,090,498 | 5/1978 | Benson | 126/438 |
| 4,098,264 | 7/1978 | Brokaw | 237/1 A |
| 4,103,672 | 8/1978 | Meyer | 237/1 A X |
| 4,111,360 | 9/1978 | Barr | 237/1 A |
| 4,131,109 | 12/1978 | Coxon et al. | 126/438 |
| 4,153,038 | 5/1979 | McDonald | 126/425 |

FOREIGN PATENT DOCUMENTS

490446  2/1954  Italy .................................. 126/438

Primary Examiner—William E. Wayner
Assistant Examiner—Henry Bennett
Attorney, Agent, or Firm—Klein & Vibber

[57] ABSTRACT

Solar energy system incorporating a dirigible motor-driven collector and an electronic sensor for turning the collector to follow the sun. The collector is turned progressively during the day to occupy successive positions during predetermined time periods in which it collects solar energy most efficiently, at the end of the day automatically returning the solar collector to its initial, morning position. The system is controlled by an arrangement which is composed largely of a novel combination of commercially available units, thereby cutting its cost and increasing its reliability.

12 Claims, 10 Drawing Figures

SOLAR ENERGY SYSTEM

BACKGROUND OF THE INVENTION

Men have long sought to derive energy from the sun. Many of such endeavors are described in the book "Solar Energy" by Daniel Behrman, published by Little Brown & Co., copyright 1976. Such book describes, for example, the use of concave mirrors to perform burning experiments, and the use of a burning glass by Lavoisier which was turned to follow the sun. More recent work includes the use of a field of many mirrors which are turned to follow the sun and which reflect their incident rays onto a boiler. The Honeywell company is presently employing a parabolic trough collector which is tipped to face the sun and which is turned to follow the sun by clockwork. Other methods of tracking the sun by solar energy collectors are disclosed in MECKLER U.S. Pat. No. 4,027,653 and NAPOLI ET AL U.S. Pat. No. 4,041,307.

The most commonly proposed and used solar energy systems today incorporate roof or sidewall panels fixedly connected to a house or other support; such panels for instance may include copper pipes through which water flows to be heated and then stored in an insulated storage tank. One such system is described in the Apr. 17, 1977 "New York Times", Section 8, page 1. Another currently used solar energy system employs a fixed curved solar collector which heats water flowing therethrough. The heated water heats and vaporizes freon, the freon in turn driving a turbine employed for example in pumping irrigation water. Such latter system is described in the "New York Times", Wednesday, May 25, 1977, page B1.

SUMMARY OF THE INVENTION

The present invention has among its objects the provision of a fully-automatic solar energy system that operates at peak efficiency at any time the temperature of the water in the solar collecting coil is at a predetermined temperature, for example 25° F., higher than the water temperature in the storage tank. The solar energy system of the invention is disclosed as alternatively supplying the heating needs of a domestic hot water system and a space heating system, such as baseboard hot water radiation. The solar energy system includes an automatic, step-by-step solar energy collector, a solar sensor that senses the angle of the highest heat intensity and forwards a signal to a control circuit which rotates the collector into such position and maintains it there for a predetermined length of time until the sensor indicates that the collector must be turned to a further, new position in which it operates at peak efficiency. At the end of the day, when the temperature of the water in the solar collector is no longer higher than said predetermined temperature, the collector is automatically turned into its initial, morning position.

In the preferred embodiment disclosed, the sensor includes a plurality of angularly spaced heat-sensitive elements mounted on a conical heat-insulating support, each such heat-sensitive unit closing the contacts of its respective normally-open relay when the sun's rays impinge directly or substantially directly upon such heat-sensitive unit. Such relays progressively short-out or by-pass serially-connected sections of a resistor functioning as one leg of a Wheatstone's bridge, the opposite resistance in the bridge being provided by a position-indicating potentiometer having a movable contact, the position of such contact being a function of the angular position of the solar collector. The currents passing through the four-part resistor and the potentiometer are compared by a current-balancing relay, which is a two-coil unit containing a walking-beam type armature with a single-pole double-throw contact affixed thereto. Depending upon which of the two coils of the relay is favored by the greater of the two relay coil currents, the collector motor drive response is automatically controlled by the sensor's four-step potentiometer output.

When a null point in the bridge circuit is reached, that is, when there is a balanced bridge condition, the current differential relay contacts open, the collector drive motor stops, and the motor rests until the sensor advances to the next step and subsequently commands the collector to rotate to the next angle of incidence.

The solar energy system is hydronically, mechanically, and electrically fail-safe, as follows:

A low-temperature controller, which contains a single-pole, single-throw contact which opens when the collector coil water temperature drops to 35° F., de-energizes all collector loop solenoid valves, removing the collector coil from the domestic water system by way of two normally-closed solenoid valves, completes the domestic hot water circuit by way of one normally-open solenoid valve, and drains the water from the collector coil via two normally-open solenoid valves.

An over temperature switch is provided for the purpose of defocusing it to protect the collector from high temperature damage. Such switch is set to open when the collector water temperature reaches a temperature of 250° F., for example, thereby to return the collector to its starting position. Subsequently, when the collector temperature drops to 220° F., for example, the over temperature switch automatically resets (closes) and returns the collector to a position as dictated by the sensor.

BRIEF DESCRIPTION OF THE DRAWINGS

FIGS. 8 and 9 when taken together schematically illustrate the entire mechanism for the automatic control of the illustrative embodiment of solar heating system in accordance with the invention.

DISCLOSURE OF PREFERRED EMBODIMENT

Figure 1:
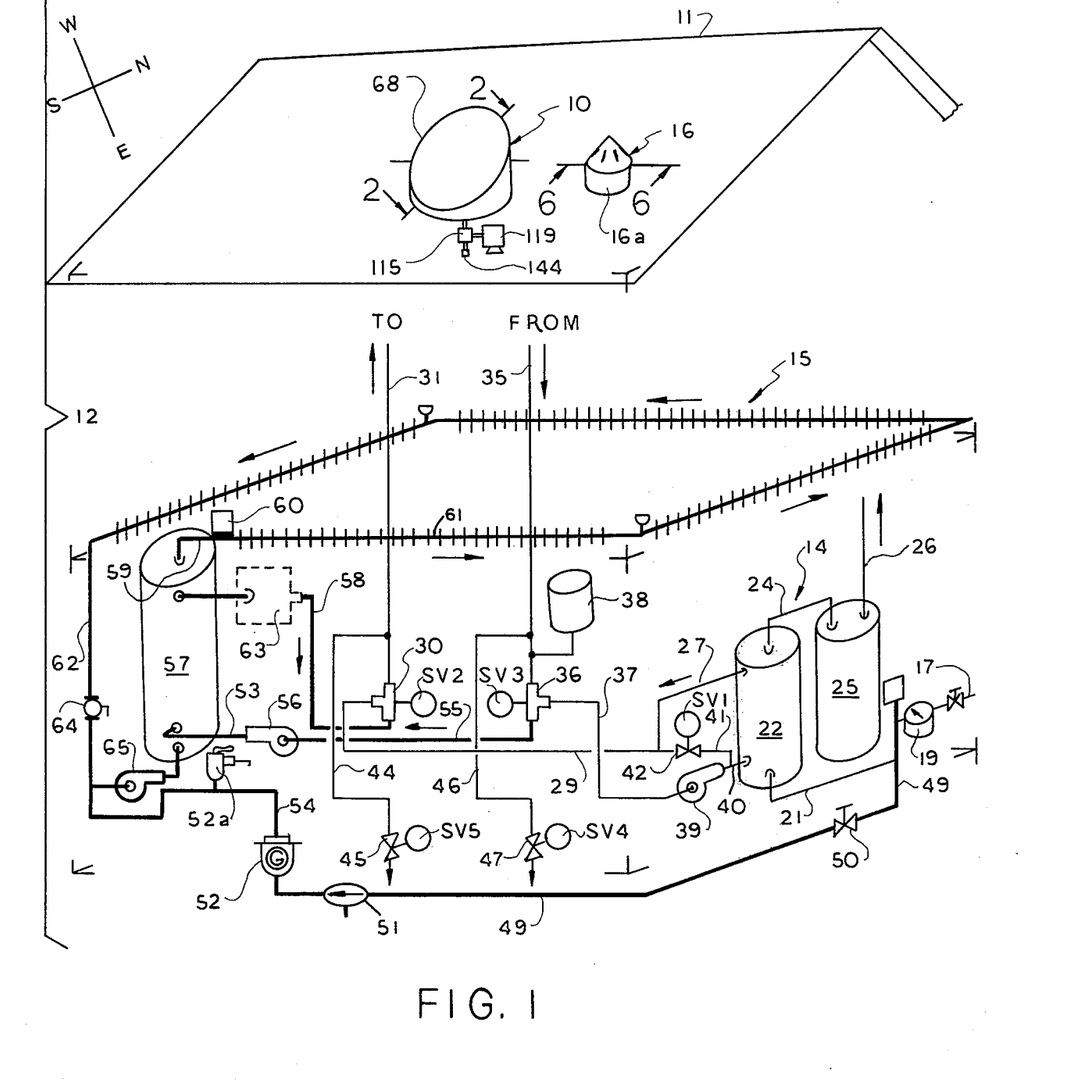
FIG. 1 is a schematic exploded view in perspective of a house provided with a solar heating system in accordance with the invention, such system being selectively employed to heat the domestic hot water system for the house or to heat, or supplement the heating of, the space of the house.

Turning now to FIG. 1, there is there shown an assembly 10 including a rotatable or dirigible solar collector 68 mounted on the roof 11 of a house 12, the turning of the collector 68 being controlled by a solar sensor 16, which is also shown mounted on the roof 11. It is to be understood that one or both of the collector and sensor may be mounted in other manners, such as on a tower adjacent to the house, or in an outside wall of the house. Collector 68 collects solar heat to provide heat for a domestic hot water system 14 and, alternatively, for the hot water heating equipment 15 for the house itself. The collector 68 includes at least one coil of pipe through which there flows, in a first mode of operation of the system, the water of the domestic hot water supply 14, and, in a second mode of operation, the water of the house heating system 15. The domestic hot water system is generally shown in light lines, whereas the house heating system is generally shown in heavy lines.

The systems 14 and 15 employ some elements which are common to both. If it is desired to isolate the water in the two systems from each other, as well as from the liquid in the collector system proper, there may be provided a heat exchanger (not shown) having a primary channel system connected to the coils in the collector 68, the heat exchanger having two secondary channels through which the donestic hot water and water in the heating system 15, respectively, flow. If the heat exchanger is located in the house, and the collector coil and the primary channel system are filled with anti-freeze no draining of such system is necessary in very cold weather.

By the use of an ASME approved back-flow prevention device such as shown at 51 in FIG. 1, there is no need for heat exchangers, providing the entire system uses copper water pipes and glass-lined storage tanks. An ASME approved back-flow prevention device is a legal and approved connection to isolate a process water system from a potable water system. Further, by eliminating the need for heat exchangers, a dramatic increase in system efficiency is achieved.

The collector 68 is mounted to follow the sun as it appears to move across the sky from morning until night so that the collector is in at least substantially its most effective or optimum position at all times during the time span in the day at which the heating effect of the sun is most effective. For this purpose, the collector 68, which is mounted at such angle as substantially to face the sun at the latitude where the house is located, is mounted in an opening in the roof for rotation about a vertical axis, as will more clearly appear upon consideration of FIG. 2. The rotation of the collector 68, as stated above, is under the control of a sensor 16, which is likewise mounted in an opening in the roof of the house, in a position to be exposed to the full rays of the sun throughout the day. The sensor is shown more particularly in FIGS. 6 and 7.

The Heating System

In the simplified solar heating system shown in FIG. 1, and with the system in its "summer" or domestic hot water heating mode of operation, water enters the house through a pipe 17, and a water meter 19, and flows through a pipe 21 to the bottom of a conventional (existing) domestic water heater 22. Water flows from the top of water heater 22 through a pipe 24 into a storage hot water tank 25, from which it flows through a delivery pipe 26 to the various hot water taps (not shown) and the like throughout the house. When the solar heating system is not in domestic hot water heating operation, the domestic hot water supply for the house is provided by the hot water heating means 22 in the usual manner.

Figure 2:
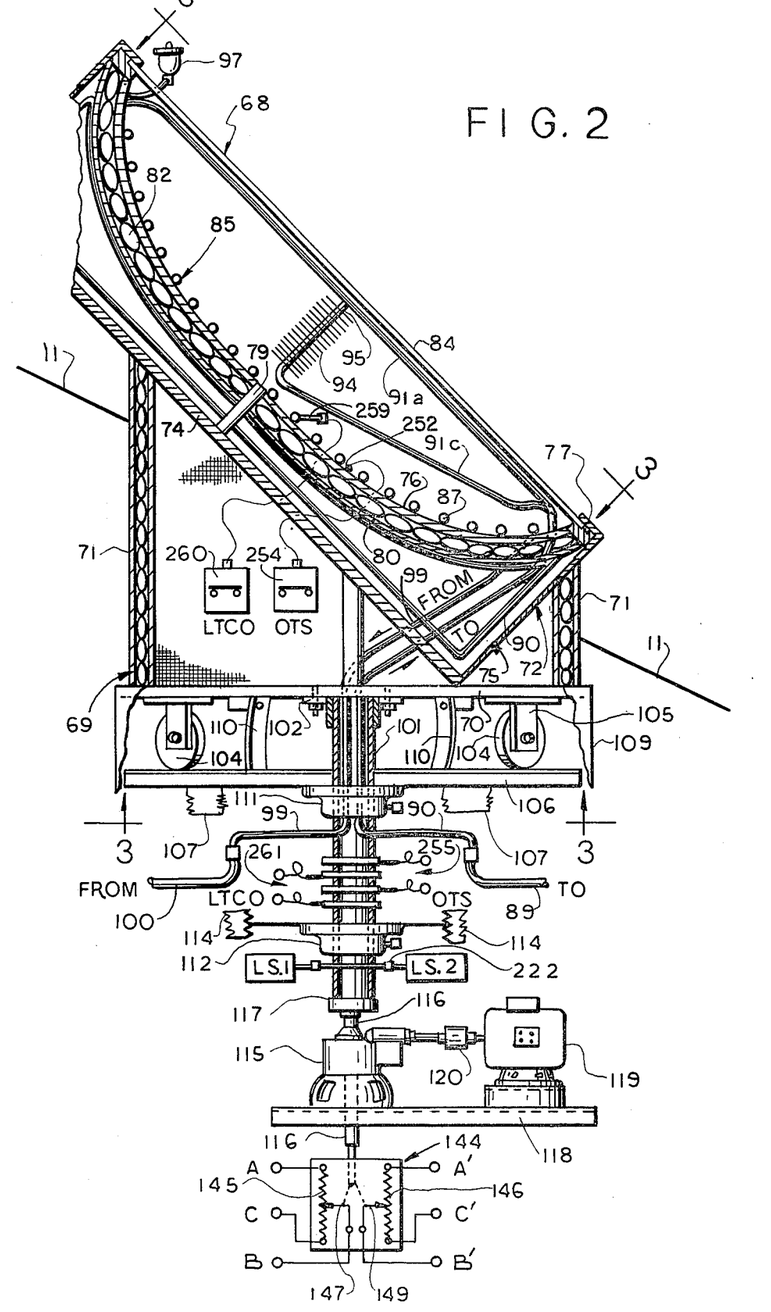
FIG. 2 is a view partially in vertical section and partially in side elevation of the solar collector and the positioning driving means of the system shown in FIG. 1, the collector being shown facing to the right.

When the solar heating system is in operation, and the solar energy system is heating the domestic hot water supply in a manner now to be described, water flows from the top of the tank of the water heater 22 through a pipe 27 into a further pipe 29 and thence through a valve 30 operated by a solenoid SV2 into a pipe 31 to a flexible hose 89 which is connected to the outer end of a heating coil 85 in the collector 68 as shown in FIG. 2. After being heated in the collector, water flows from the solar heating coil 85 through a flexible hose 100 into a pipe 35, through a valve 36 which is operated by a solenoid SV3, and a pipe 37 to a pump 39 which is then in operation. The delivery port of pump 39 is connected to the bottom of the tank of water heater 22 through a pipe 40. Valves 30 and 36, and pump 39 are under the control of the portion of the system shown in FIGS. 8 and 9, the switch 230 (FIG. 9) then being in its "summer" position.

Alternatively, water may be permitted to flow from the bottom of the tank of the water heater 22 through the pipe 40 and thence into a pipe 41 connected to the pipe 29, there being a normally closed by-pass valve 42 operated by solenoid SV1 interposed in pipe 41. The thus described domestic hot water supply system is held under pressure by an expansion tank 38 which is connected to pipe 35.

In very cold weather water can be drained from the solar heating coil 85 of the collector and from the pipes 31 and 35 by opening a normally closed valve 45, operated by a solenoid SV5, and a normally closed valve, 47, operated by a solenoid SV4, the water then flowing through pipes 44 and 46 to a sump (not shown).

The space heating portion of the system is supplied with water through a pipe 49, from which the above-described pipe 21 branches, through a then open shut-off valve 50, the back-flow prevention valve 51, a pressure regulating valve 52, to a pipe 54 which is connected to the space heating portion of the system in a manner to be described. A safety or high pressure relief valve 52a is connected to pipe 54. A pipe 55, leading from the valve 36, is connected to a pump 56 the delivery port of which is connected through a pipe 53 to the lower end of a tank 57 which serves as the storage tank for the hot water space heating system; such system is here shown as a loop of finned tubing 15 employed, for example, in baseboard radiation. Hot water is taken from the top of tank 57 by a pipe 59 leading to the finned tubing loop 61, there being an aquastat 60 interposed in pipe 59. Hot water travels around the loop 61 and is returned to tank 57 by a pipe 62 having a flow control valve 64 interposed therein and a second pump 65 the delivery port of which is connected to the bottom of the storage tank 57. Water flows from tank 57 through a pipe 58 leading to valve 30. The space heating system may be supplemented by a conventional hot water heating boiler 63 interposed in pipe 58.

Figure 9:
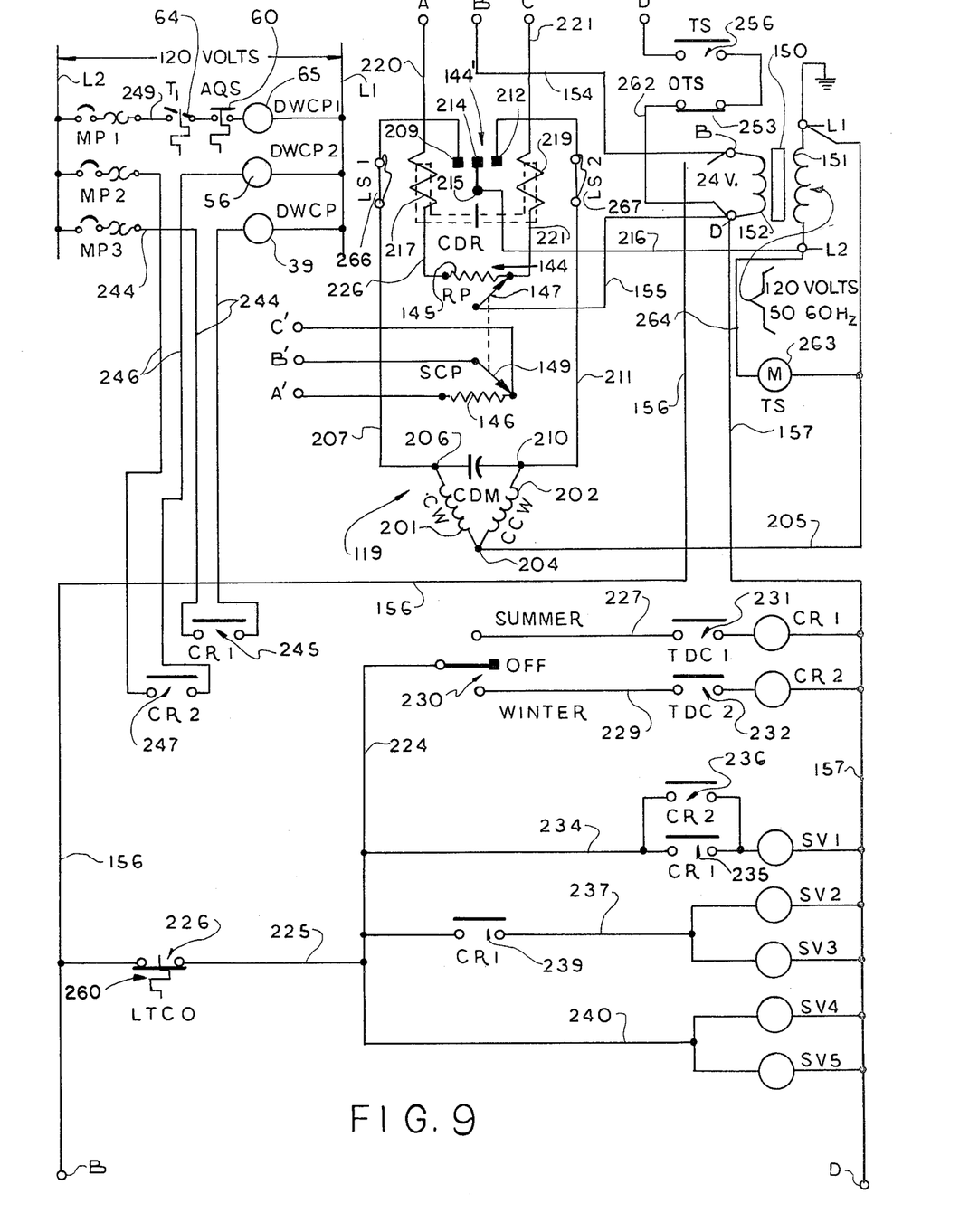
FIG. 9 is a view of the second portion of the automatic controls for the solar heating system, the view including a diagram of a second portion of the wiring of the controls.

The circulating pump 65 is under the control of aquastat 60, and pump 56 is under the control of a relay CR2 (FIG. 9). It is to be understood that the hot water space heating portion of the system may serve to supplement heat provided by other heating means for the house, such as a hot air system, or that it may constitute the sole space heating means for the house. The hot water space heating portion of the system may also be provided with a thermostat 88 (Ti) (FIG. 9) which cooperates with the aquastat 60 (AQS) to control the circulating pump 65 as shown in FIG. 9.

The Solar Collector

Turning now to FIGS. 2 to 5 inclusive, there are there shown in detail the collector 68, the means for mounting the collector, and the means for rotatably driving it. A box-like support 69 having a horizontal bottom 70 and a circular cylindrical side 71 is mounted so that the upper portion of the side 71 thereof extends through a hole in the roof 11, such side being suitably sealed to the roof by means not shown to prevent the leakage of water into the house. The upper end of the side 71 is disposed in a plane which is generally parallel to the plane of the roof 11. An open-topped box-like structure 72 having a bottom 74 and a generally rounded side 75 is disposed within the support 69 with the side 75 thereof resting on top of the shorter portion of the side wall 71 and with the bottom thereof resting on top of the longer portion of side 71 of the support 69. A parabolic reflector plate 76 made of metal such as copper is supported at its edge in a ring support 77 attached to the upper edge of the side wall 75, the center of the reflector being further supported by a rod 79 projecting from the bottom 74 of structure 72. There is provided a backing plate 80 for the reflector 76, the backing plate having a contour similar to the reflector and being spaced rearwardly thereof to provide room for a layer of insulation 82 between the backing plate and the reflector. The collector is provided with a transparent plate 84 which covers the reflector to protect it from precipitation and the like, the cover 84 being supported at its edges on the upper edges of the side wall 75 of the supporting structure 72.

Figure 3:
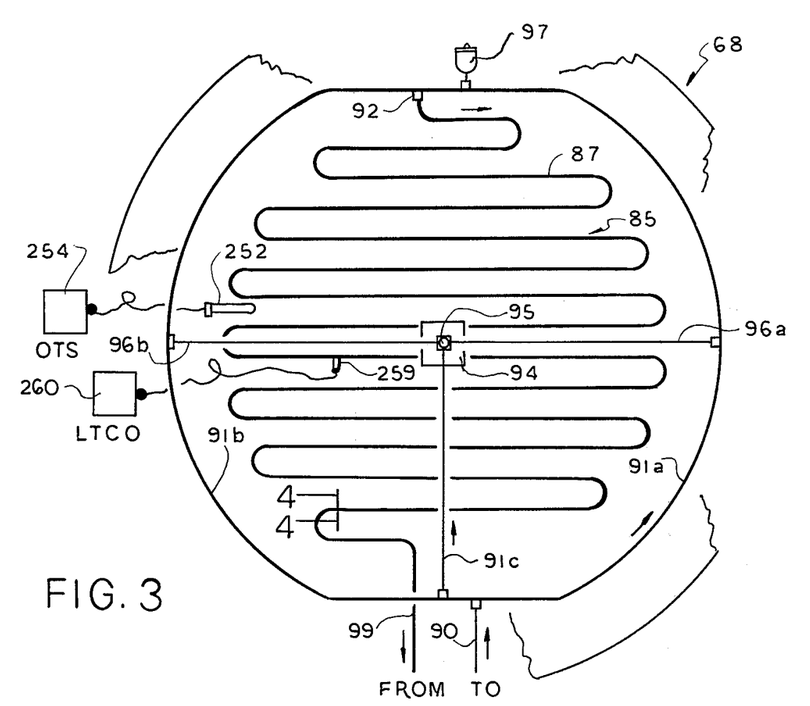
FIG. 3 is a view in plan of the solar collector of the system, the view being taken from line 3—3 in FIG. 2.
Figures 4, 5:
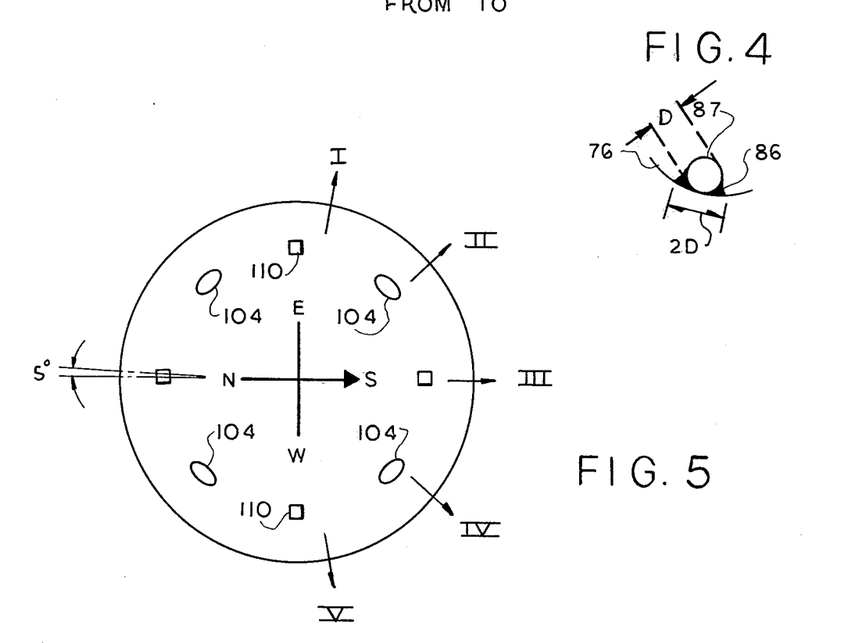
FIG. 4 is a view in section taken along the line 4—4 in FIG. 3.
FIG. 5 is a view in horizontal section through the solar collector, the section being taken along the line 3—3 in FIG. 2.

Tubing 87 made of metal with good heat conductive properties, such as copper, is disposed in a zigzag arrangement 85 (FIG. 3) on the upper, concave surface of the reflector 76, the tubing being accurately positioned in good heat conductive relationship with the reflector by being brazed or soldered thereto as shown at 86 in FIG. 4. The total width of the brazing metal 86 may be 2D, that is, twice the Diameter of tubing 87.

As shown in FIG. 2, a flexible hose 89 is connected to the input pipe 90 of the collector, hose 89 being connected at its bottom end to the pipe 31 shown in FIG. 1. As shown in FIG. 3, the pipe 90 is connected to oppositely extending branches 91a and 91b which extend about the outer edges of the reflector 76. A third input branch 91c extends radially inwardly to the center of the reflector, as shown in FIGS. 2 and 3, where it is bent to extend outwardly along the axis of the reflector into a finned portion 94, the outer end of the finned portion being joined at 95 to tubing branches 96a and 96b which extend diametrically of the reflector and are joined at their outer ends to the branches 91a and 91b. The finned tubing 94 adds markedly to the efficiency of the collector, since it is disposed at the location of greatest heat concentration of the reflector 76.

The end of the tubing arrangement shown at the top in FIG. 3 is joined at 92 to the ends of the branches 91a and 91b. Adjacent to connection 92 the arrangement is provided with an air escape valve 97. The end of the tubing arrangement at the bottom of FIG. 3 extends into a portion 99 to which there is connected a flexible hose 100 (FIG. 2), the lower end of which is connected to the pipe 35 shown in FIG. 1. The hoses 89 and 100 are long enough to permit the required degree of turning of the collector 68 between its terminal angular positions.

As shown in FIG. 2, the bottom 70 of the support 69 is fixedly connected to the upper end of a vertical hollow shaft 101 by a fitting 102, the support 70 being disposed coaxial of shaft 101. The weight of the collector including the supporting structures 69 and 72 of borne by a disc-like supporting member 106 which is affixed to timbers 107 of the house, the weight of the collector and its supporting structures being borne by a plurality of wheels 104 (four shown) which are rotatably mounted in fittings 105 attached to the support 70 and which run on the top of the fixed horizontal plate 106. The shaft 101 extends upwardly through a central opening in the plate 106, the upper end of shaft 101 being guided with respect to the plate 106 by a bearing 111 therebetween. The lower end of the shaft 101 is mounted in a lower bearing 112 which is mounted upon further fixed structure 114 of the house. The wheels 104 and the supporting plate 106 are protected by a flexible skirt 109 which extends vertically from the periphery of the member 70, the track of the wheels 104 on the supporting plate 106 being kept clear by a plurality (two shown) of flexible wiper members 110 which are affixed to the plate 70.

The shaft 101 and thus the collector 68 and its supporting structures are rotated between successive positions thereof by a stepping motor 119 which is mounted upon a fixed support 118, the drive shaft of the motor 119 being connected by a coupling 120 to the input shaft of a speed reducing gear box 115 of the right-angle type. The output shaft 116 of the gear box 115 is connected to the lower end of the shaft 101 by a coupling 117.

Below the lower end of the drive shaft 116 of the gear box 115 there is diagrammatically shown in FIG. 2 a potentiometer 144 the function of which will be more fully discussed in connection with the description of the sensor shown in FIGS. 6 and 7 and its manner of operation. It will suffice here to say that the movable contactor 147 of the potentiometer 144 is drivingly connected to the shaft 116 so that the contactor 147 rises and falls (as it is there shown) as the collector 68 is driven in reverse directions. Contactor 147 together with a resistor 145 along which it travels and with which it makes contact function as a potentiometer. A terminal B is shown connected to the contactor 147, the opposite ends of the resistor 145 being connected to terminals A and C. A movable contactor 149 similar to contactor 147, and a resistor 146, which is similar to resistor 145, with which contactor 149 cooperates, are similarly connected to terminals A', C', and B'. Resistor 146, contactor 149, and terminals A', C', and B', may be employed in the control by sensor 16 of a slave collector (not here shown) which will move in the same manner as collector 68, thereby permitting one sensor, of which the potentiometer 144 is a part, to command a plurality of solar collectors. The potentiometer 144 may be a Honeywell receiving potentiometer #Q181 A with two potentiometer decks.

The Control System

The Solar Sensor

Figures 6, 7A:
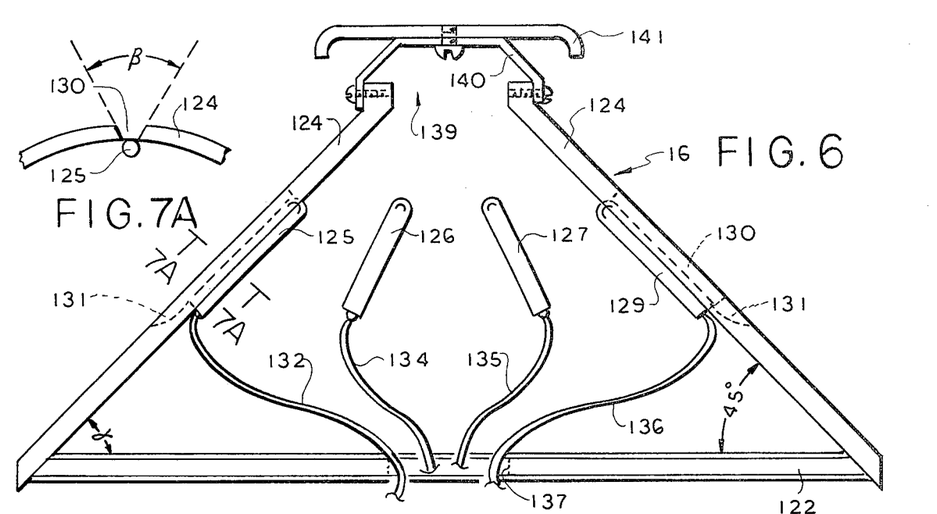
FIG. 6 is a view in vertical section through the solar sensor, such section being taken along the line 6—6 in FIG. 1.
FIG. 7a is a fragmentary view in section through the collector taken on the line 7a—7a in FIG. 6.
Figure 7:
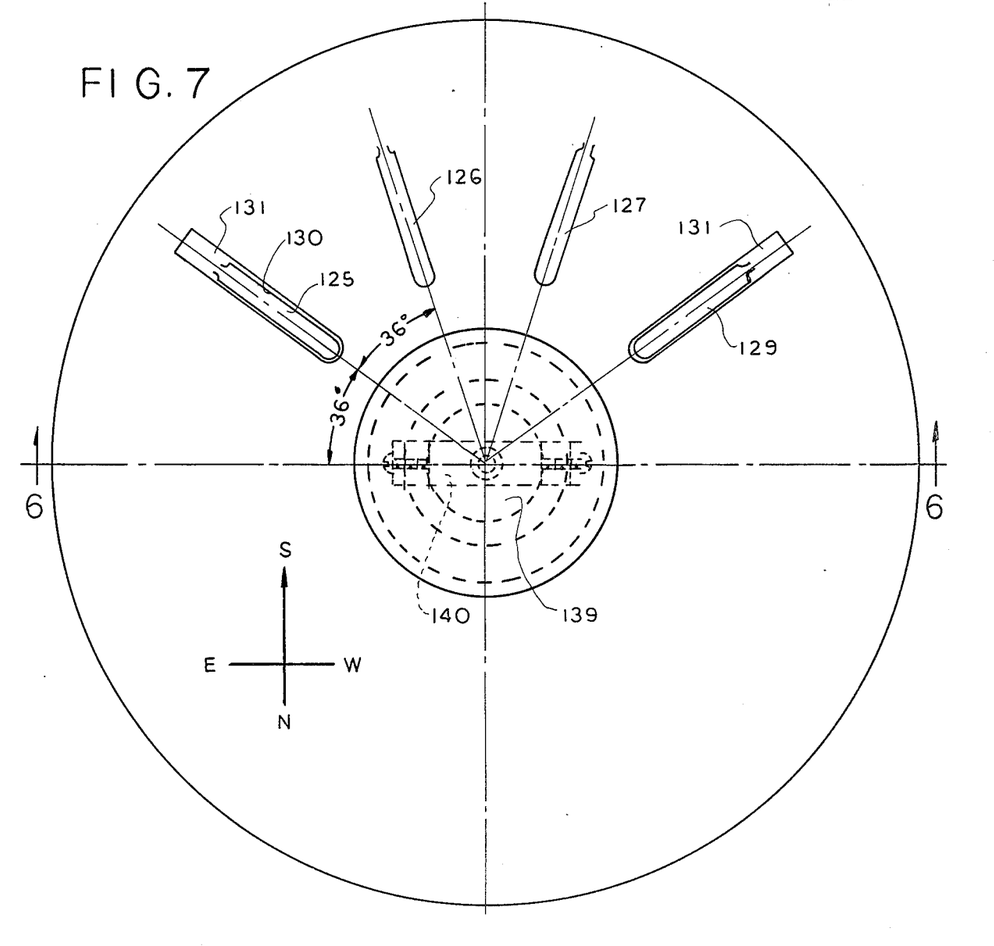
FIG. 7 is a view in plan of the solar sensor.

The sensor 16 which is shown in FIG. 1 supported on the roof 11 on a suitable support 16a, is is shown in detail in FIGS. 6 and 7. The circular base 122 of the sensor is disposed horizontal, as shown in FIG. 6. On base 122, and coaxial with it, there is disposed a cone 124 which is made of material of poor heat conductivity such as heavy paperboard, chip board, or the like. The apex angle of member 124 is shown as being 90°, base angle alpha ($\alpha$) which the elements of member 124 from the base 122 therefore being 45°. The base angle $\alpha$ for each installation should be determined from a latitude map for the particular installation so as the cause the heat responsive elements of the solar sensor to be exposed most advantageously to the sun as it travels across the sky. The value of the apex angle is determined by the value of $\alpha$. Disposed in a plurality of (four shown) equally angularly spaced V-shaped slots 130 located along elements of the cone 124 are temperature sensitive gas or liquid containing bulbs 125, 126, 127 and 129, the narrower, inner ends of slots 130 being of such width that with the temperature sensitive bulbs which underlie them are disposed mainly within the member 124, a fraction, generally somewhat below one-half, of the outer surface of the bulbs being disposed above the outer surface of the cone 124. The temperature sensitive bulbs may be held in place by any convenient means; it has been found advantageous to set such bulbs in place by a suitable adhesive. The outer surface of conical support 124 is preferably white or at least light-colored, so as to absorb a minimum of solar heat. The slots 130 have opposed sidewalls disposed at an angle $\beta$ with respect to the peripheral surface of the conical member 124, as shown in FIG. 7a, the angle $\beta$ being so chosen as effectively to shield the bulb from the rays of the sun until the sun has moved to the position at which the bulb is to become responsive to the rays of the sun.

It is to be understood that the number of temperature sensitive bulbs, and their angular spacing, may be varied as required in a particular installation. It will be seen from the compass designation in FIG. 7, and more particularly in the following description, that the temperature sensitive bulbs 125, 126, 127 and 129 are sequentially subjected to the maximum heat from the sun in that order as the day progresses. Bulbs 125, 126, 127 and 129 are parts of respective controllers PC1–PC4, (FIG. 8) to be described in detail in connection with FIGS. 8 and 9. A suitable temperature controller having temperature sensitive bulbs is that manufactured by Honeywell and designated L 400 8 B.

It has been found that the mounting of the temperature sensitive bulbs on the conical member 124 eliminates any necessity for the angular adjustment of the axis of member 124 of the solar sensor 16 with respect to the horizontal as the elevation of the sun varies from season to season.

The sensor 16 is exposed directly to the sun. To permit water from rain, dew, and snow to drain readily from the exposed outer surfaces of the temperature sensitive bulbs, the lower ends of the slots 130 terminate in a scalloped, water-draining groove 131. In order to prevent the overheating of the temperature-sensitive bulbs, there is provided a central hole 137 through the support 122, hole 137 permitting the ingress of atmospheric air to the interior of the conical support 124. The top of support 124 is cut off, as shown, to provide a passage 139 therethrough. In order to prevent the passage of much if any rain, snow, or dew into the interior of support 124, member 124 may be provided with a cover 141 which is supported substantially spaced therefrom by a bracket 140, to allow the lateral passage of ventilating air which travels upwardly through the hole 139.

The Control Circuit

Each of the temperature sensitive bulbs 125, 126, 127 and 129 is provided with a capillary tube, the tubes being designated, respectively, 132, 134, 135 and 136, the tubes leading to control units PC1, PC2, PC3 and PC4, respectively. The capillary tubes are led through the opening 137 in the support 122 for the solar sensor, and extend to the respective control units PC1–PC4, inclusive, as shown in FIG. 8.

Figure 8:
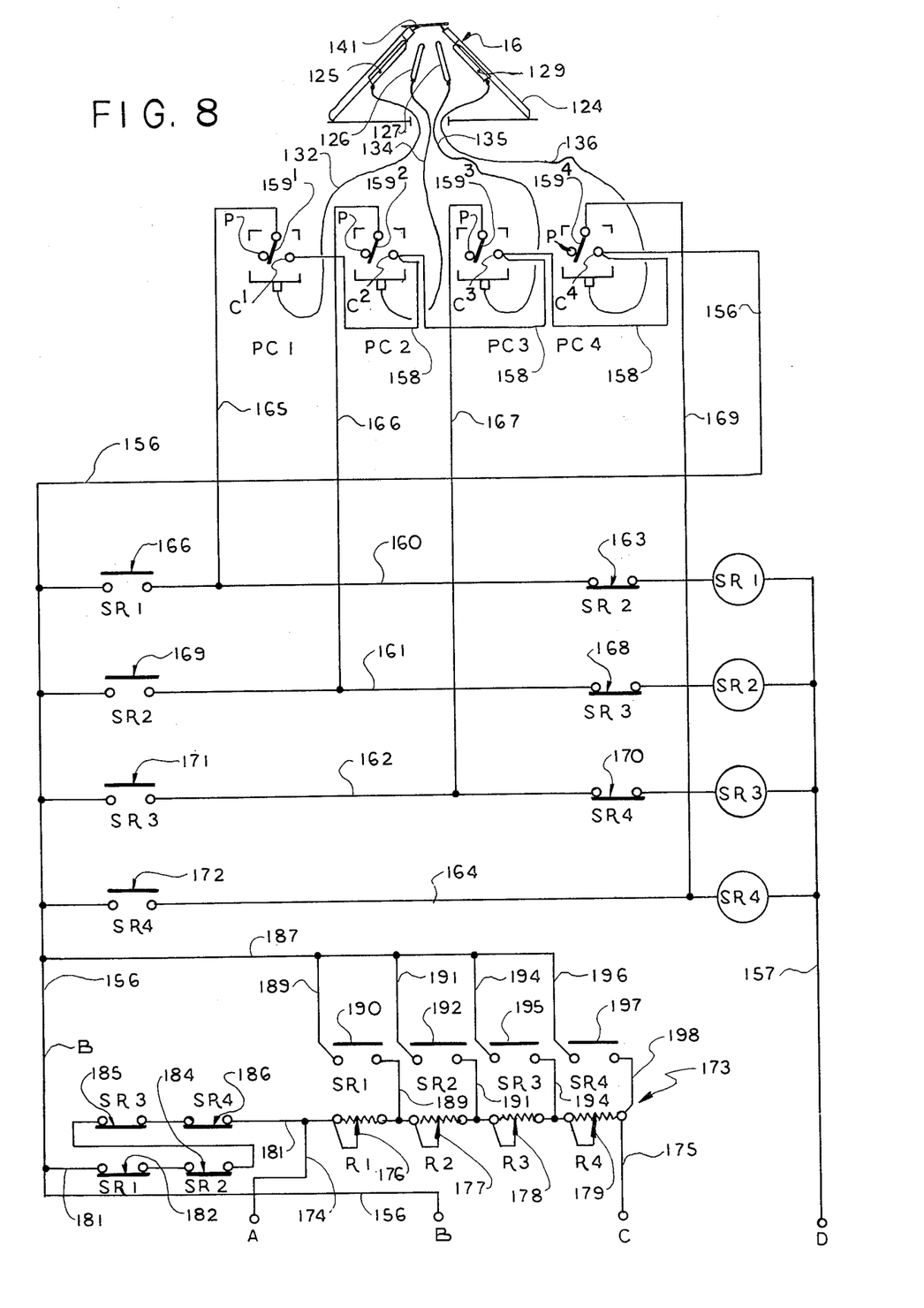
FIG. 8 schematically illustrates a first portion of the automatic controls for the system, such view including the solar sensor and a diagram of a first portion of the wiring of the controls.

Turning now to FIG. 8, it will be seen that each of the control units PC1, PC2, PC3 and PC4, has a single switch, each of the switches being shown in its open position with its movable contactor $159^1$, $159^2$, $159^3$ and $159^4$, respectively, in engagement with its fixed pin P. In accordance with the invention each of the control units is adjusted so that the switch thereof closes by the swinging of its contactor to engage the respective contact $C^1$–$C^4$, when the respective temperature sensing bulb reaches a predetermined temperature. In a preferred embodiment, all of the controllers PC1–PC4 are set so that the switches of the controllers close when their bulbs reach a temperature of 120° F. It is to be understood that such temperature is illustrative and that the switches of the control units may be set to close at different values depending upon the conditions prevailing at the location of the system at a given season. The control units will be located so that such adjustment of the temperature of the bulbs at which the switches close can be readily carried out, if necessary. It will be seen that, in accordance with the invention, the switches of control units PC1–PC4, inclusive, close in sequence. For example, the switch of unit PC1 might close at 10:30 o'clock in the morning of a sunny day, the switch of unit PC2 might close at 12:00 noon, the switch of unit PC3 might close at 1:30 p.m. and the switch of unit PC4 might close at 3:00 p.m.

The solar sensor 16 functions to cause the solar collector 68 to turn progressively from a starting position I (FIG. 5) in which it faces to the east to collect energy from the sun from, for example, dawn until 10:30 a.m., to a second position II at which it optimally collects energy from the sun from 10:30 a.m. to 12:00 noon, to a third position III in which it best collects the energy of the sun from 12:00 noon to 1:30 p.m., to a fourth position in which it best collects solar energy from 1:30 p.m. to 3:00 p.m., and then to a fifth position in which it best collects solar energy from 3:00 p.m. to dusk. The switches of the control units PC1–PC4 are so connected that the motor 119, for turning the solar collector, is under the control of the last controller to close its switch in the above sequence. As a result, the solar collector is always in a position to insure its most efficient collection of solar energy. At the end of the day, the collector is automatically returned to its starting position, facing the east, to be ready for the next day, as will be explained in connection with FIGS. 8 and 9.

Turning now to FIG. 9, it will be seen that this system is supplied from a 120 volt 50/60 hz current source $L_1$, $L_2$ which is connected to the primary 151 of a transformer 150. The secondary 152 of the transformer has terminals B and D which supply 24 volt alternating current to wires 154 and 155. Wires 154 and 155 extend to terminals B and D, which are also shown in FIG. 8 Line $L_2$ of the current source is connected to wire 216 which extends to the terminal 215 of the movable central contactor 214 of the current differential or bridge balancing relay 144'. Relay 144' may, for example, be one manufactured by Honeywell and sold under the designation model R7103C. The other line $L_1$ of the current source is connected to ground as shown, and to a wire 205 which extends to the terminal 204 of the motor 119 which rotates the solar collector. Motor 119 may be one sold by Honeywell under the designation "Actionator Motor Model M930B". Such motor has a forward winding 201 and a reverse winding 202, such windings being connected at one end of each to terminal 204, the other end 206 of field winding 201 being connected by a wire 207 to the left hand contact 209 of the bridge balancing current differential relay 144', the other end 210 of field winding 202 being connected by a wire 211 to the right hand contact 212 of the relay 144'.

Relay 144' detects a difference in current flow through its two coils, the coil at the left being designated 217 and the coil at the right being designated 219. Coils 217 and 219 are wound on their respective cores, as shown, the magnetic field of coil 217 acting to pull the central needle contactor or beam of relay 144' bearing contact 214 to the left and the magnetic field of coil 219 acting to urge the beam on a contactor 215 to the right. When the flows of currents in the respective coils 217 and 219 are equal, the contactor 214 lies in a central position, shown in FIG. 9, in which the contactor 214 thereof does not engage either of fixed contacts 209 or 212.

The lower ends of the relay coils 217 and 219 are connected by wires 226 and 221', respectively, to the opposite ends of the fixed resistance 145 of potentiometer 144, such resistance being mounted as the slide wire resistance of a potentiometer and being engaged by a slide contactor 147 which turns through the same angle as do the motor shaft 101 and thus the solar collector 68. Such movement varies the resistance in the respective portions of resistance 145, which are connected between the contactor 147 and the lower ends of the relay coils 217 and 219. The movable contactor 147 is connected to terminal D of the secondary (24 v) of the current supply transformer 150 by a wire 155. The upper ends of relay coils 217 and 219 are connected through wires 220 and 221 to terminals A and C, respectively, at the top of FIG. 9. The terminal B at the top of FIG. 9 is connected to terminal B of the secondary of the transformer 150 by a wire 154. The terminals A, B, C and D in FIG. 9 are the same as those shown in FIG. 8.

Turning now to FIG. 8, there is there shown a resistor 173 which is connected between wire 174 from terminal A and wire 175 from terminal C. Resistor 173 is made up of four equal resistances R1-R4 connected in series, each such individual resistance being, for example, rated at 50 ohms-10 watts each. Their total resistance, 135 ohms, equals the total resistance of resistor 145 of potentiometer 144 (145, 147).

Each of the individual resistors R1-R4, inclusive, is provided with a shunt adjustment 176-179, inclusive, respectively, whereby each resistor may be made to have an effective resistance of exactly 33.75 ohms.

The 24 volt control voltage from the secondary of transformer 150 is applied across terminals B and D, and thus between main wires 156 (connected to terminal B) and 157 (connected to terminal D). A wire 187 extends from wire 156 to wires 189, 191, 194, and 196, which are connected to a first contact of each respective contact and contactor set or switch 190, 192, 195, and 197, respectively. Switches 190, 192, 195, and 197 form parts of relays SR1-SR4, respectively, to be further described below. Wires 189, 191 and 194 are connected to the junctions between successive resistors R1-R3, and the second contacts of the switches 190, 192, and 195. A wire 198 extends from the second contact of switch 197 to the right hand end of resistor R4 which is connected to terminal C through wire 175. Upon the progressive closing of switches 190, 192, 195, and 197 the effective resistance of resistance 173 between wires 156 and 175 is reduced by steps of 33.75 ohms a step. The left hand end of resistance R1 is connected to a wire 181 connected to main wire 156, series switches 182, 184, 185, and 186 being interposed in wire 181. Switches 182, 184, 185, and 186 form parts of relays SR1, SR2, SR3, and SR4, respectively.

It will be seen that the loop made up of the resistor 173, the left hand relay coil 217, the resistor 145, and the right hand relay coil 219 constitutes a Wheatstone's bridge, one terminal, B, of the 24 volt control system being connected to the left hand end of the effective portion of resistor 173 and the other terminal, D, of the 24 volt power source being connected to the slider 147 coacting with the resistor 145 of potentiometer 144. The slider 147 is shown in FIG. 9 in the position which it occupies when the collector is in its first (dawn) position. The current flow through the portion of the loop which includes the effective length of resistor 173 interposed between wires 156 and 175 is balanced against the current flow in the portion of the loop including the corresponding effective portion of the resistor 145.

The control system of the present invention includes means whereby successive portions R1, R2, R3 and R4, are effectively eliminated from portion of resistance 173 interposed between wires 156 and 175 by the successive actions of control units PC1, PC2, PC3, and PC4, as dictated by their temperature-sensitive bulbs 125, 126, 127, and 129, respectively. Upon the elimination of successive resistors R1-R4 of resistance 173 from between wires 156 and 175 the motor 119 acts to turn the solar collector in each case until a current balance is established in the loop as determined by the position of the slider 147 relative thereto.

As shown in FIG. 8, the right-hand contacts $c^1-c^4$, inclusive, of each of control units PC1, PC2, PC3, and PC4, respectively, are all connected to wire 158, such contacts in turn being connected to a first terminal B of the 24 volt control circuit through wire 156. The central upper terminals $159^1-159^3$ inclusive of control units PC1, PC2, and PC3, are connected through wires 165, 166, and 167 to wires 160, 161, and 162, respectively, which lead to one terminal of the solenoids of relays SR1, SR2, and SR3. Terminal $159^4$ of control unit PC4 is connected by wire 169 to a wire 164 which leads to main wire 156 two one terminal of the solenoid of relay SR4. The other terminal of solenoid SR4 is connected to main wire 157 Switch 172 of relay SR4 is interposed in wire 164 between main wire 156 and the junction between wires 164 and 169.

Wires 160, 161, and 162 are connected to main wire 156 through switches 166, 169, and 171, which form parts of relays SR1, SR2, and SR3, respectively. As shown in FIG. 8, all of switches 166, 169, 171, and 172 are open.

Interposed in wire 160 between wire 165 and solenoid SR1 is a switch 163 made up of a set of contacts and a contactor of relay SR2. Interposed in wire 161 between wire 166 and solenoid SR2 is a switch 168 of relay SR3. Interposed in wire 162 between wire 167 and solenoid SR3 is a switch 170 of relay SR4. All of contacts 163, 168 and 170 are closed as they are shown in FIG. 8. The other terminal of each of solenoids SR1, SR2, SR3, and SR4 is connected to terminal D of the 24 volt circuit through wire 157.

It will be seen that the contacts of control unit PC1 are shunted by switch 166 of relay SR1, the contacts of control unit PC2 are shunted by switch 169 of relay SR2, and the contacts of control unit PC3 are shunted by switch 171 of relay SR3. All of contacts 166, 169, 171, and 172 are open when the solenoids of their respective relays are de-energized.

The contacts of control units PC1–PC4 need make only momentary contact. Contacts 166, 169, 171, and 172 maintain the respective solenoids SR1–SR4 energized until the next relay, in sequence, is energized by its respective PC controller. Such arrangement insures that the solar collector drive cannot slip back to its previous incorrect position should the PC1–PC4 settings not be synchronized with the position of the sun. In other words, once the collector has advanced to a position of bridge balance, it will not move until the operation of the following positioning controller PC commands it to. In the event of a power failure, the solar collector stays where it is until power returns.

Turning now to FIG. 9, there is shown a 24 volt control subcircuit having a wire 224 connected to wire 156 through the contacts 226 of the low temperature controller 260 and a wire 225. Controller 260 is preferably of the automatic resetting type. Selectively connected between the wire 224 and the other main wire 157 by a three-position switch 230 is a "summer" (domestic hot water) circuit 227 which has a series connected switch 231 of relay TDC1 and the solenoid of control relay CR1 interposed therein. A second, "winter" (space heating), subcircuit 229, selectively connected to wire 224 through switch 230 has the switch 232 of relay TDC2 connected in series with the solenoid of relay CR2 interposed therein. A third subcircuit 234 is connected to the solenoid of relay SV1 through parallel electrically connected switch 235 of relay CR1 and 236 of relay CR2. A fourth subcircuit 237 is connected to wire 224 through the switch 239 of relay CR1, and through the parallel connected solenoids of relays SV2 and SV3 to wire 157. A fifth subcircuit 240 is connected to wire 157 through the parallel electrically connected solenoids of relays SV4 and SV5.

Extending from lead $L_2$ of the 120 volt supply circuit is a wire 244 which leads to contacts 245 of relay CR1 and thence to the motor of domestic hot water pump 39. A wire 246 extends from lead $L_2$ to the switch 247 of relay CR2, wire 246 then leading to the motor of baseboard radiation pump 65. Another wire 249 connected to 120 volt lead $L_2$ is connected to the motor of baseboard radiation pump 65 through the interposed contacts 64 of the interior temperature thermostat (Ti) 88 and the contacts of the aquastat (AQS) 60 connected in series therewith. The other terminal of each of elements 39, 56, and 65 is connected to the other lead wire $L_1$.

Interposed in the previously described wire 262 leading from the terminal D of the secondary of transformer 150 to the upper terminal D in FIG. 9 are the serially connected contacts 253 of the over temperature switch (OTS) 254 and the contacts 256 of a time switch (TS) having a motor 263 one terminal of which is connected to $L_1$ and the other of which is connected to lead $L_2$ through wire 264. The over temperature sensor 254 and its probe 252 are shown in FIGS. 2 and 3. The over temperature sensor may be a Honeywell #L456 A high temperature controller.

As shown in FIG. 2, a cam 222 affixed to the hollow tube 101 has cam lobes thereof which cooperates with limit switches LS1 and LS2. As shown in FIG. 9, the contacts 266 of LS1 are interposed in wire 207 between terminal 206 of the motor 119 and contact 209 of the current differential relay 144. The contacts 267 of limit switch LS2 are interposed in wire 211 between the terminal 210 of motor 119 and the contact 212 of current differential relay 144'.

The time switch 256, 263 is a twenty-four hour time switch with a ten hour spring carry-over. It is preferred that the low temperature cut-off should be an integral component. In the illustrative embodiment the remote bulb 259 on the low temperature cut-off 260 is encapsulated in a copper well filled with a light vegetable or machine oil and a copper well brazed to the collector plate adjacent to any of the coil spirals in the same fashion as the collector coil. In this manner, the rate of heat transfer from the oil to the bulb is almost the same as if it were immersed in the collector coil liquid.

Should the temperature of the oil in the oil-filled well drop below 30° F., the drain valves SV4 and SV5 will be commanded by the low temperature cut-off 260 to drain the collector coil for freeze protection. Outdoor air temperature is not of concern here, but rather coil water temperature. Although the outdoor temperature might be below 32° F., the heat retention ability of the collector due to its intended design performance could retain the water in it above 32° F. Good collector design calls for a "diode" effect, that is, is allowed to come in and be retained by the collector, with as little heat as possible leaving the collector housing by radiation losses. Most important, when SV4 and SV5 drain the collector coil, the oil tells the low temperature cut off-bulb 259 what the coil water temperature will be, and, if the coil is not empty or dry, will automatically reset the system, and will refill the coil collector loop when the oil temperature rises above 32° F., or above whatever temperature at which the low temperature cut-off is set to operate. The over temperature sensor 254 and the low temperature cut off 260 are connected to the remainder of the circuit through slip rings and brushes 255 and 261, respectively.

The Manner of Operation of the Solar Sensor and Solar Collector

Referring to FIG. 5, it will be seen that the collector occupies five successive positions throughout the day, starting with position I and ending with position V. The I position corresponds for example to dawn to 10:30 a.m., the II position corresponds to 10:30 a.m. to 12:00 noon, the III position corresponds to 12:00 noon to 1:30 p.m., the IV position corresponds to 1:30 p.m. to 3:00 p.m., and the V position corresponds to beyond 3:00 p.m. The collector will have been returned automatically to its I position from its V position at the end of the heating day in a manner to be described. The collector remains in position I until the temperature sensitive bulb 125 operates controller PC1 to turn the solar collector to its II position, in which it remains until the temperature sensitive bulb 126 operates controller PC2 to turn the solar collector to its III position. The collector is turned, from III to IV, and from IV to V by successive operation of the controllers PC3 and PC4 by bulbs 127 and 129, respectively.

The collector is automatically returned from its V (night) to its I (morning) position as follows. The time switch 256, 263 is set to open its contacts at a time, for example 5:30 p.m., at which the collector 68 has ceased to collect a worthwhile amount of heat from the sun. The opening of contacts 256 de-energizes the solenoids of all of sensing relays SR1–SR4 (FIG. 8), thereby opening all of switches 190, 192, 195, and 197, respectively of such SR relays. This restores the full 135 ohm resistance of resistor 173. The bridge circuit is now unbalanced, and the current differential relay 144 closes its contacts 214, 212 to energize the stepping motor 119 to drive the collector 68 back to its starting I, 9:00 a.m. position. This position is determined by the opening of the contacts 267 of limit switch LS2 by the cam 222 on the hollow shaft 101. Contacts 267 remain open, thereby de-energizing the reverse winding 202 of the motor 119 until the solar collector 68 moves from its I to its II position whereupon contacts 267 close. The contacts 266 of limit switch LS1 play a similar role when the collector is in its V position, contacts 266 then being opened by the cam 222 and remaining open, to prevent further forward driving of the solar collector by the motor 119, until the solar collector begins to move from its V back to its I position. The time switch de-energizes the entire system by the opening of its contacts 256 during the night, closing such contacts at a predetermined adjustable time in order to re-activate the system at a time at least slightly in advance of the beginning of the period during which it is worthwhile to collect heat from the sun by the solar collector 68. It will be seen that the over temperature switch performs the same function as the time switch with the exception that the time switch returns the collector to its starting position as a function of time, whereas the over temperature switch or controller does so as a function of high collector temperature.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In combination, a solar tracing sensor comprising a support mounted to have successive zones thereof facing the sun in its travel across the sky during the day, and a plurality of similar heat-responsive elements mounted on the support in angularly spaced relationship so that successive elements during the day are the most highly heated by the sun during successive predetermined time periods, and a dirigible solar heat collector controlled by the solar tracking sensor, comprising a reflector having a reflecting side, means mounting the reflector so that its reflecting side faces the sun, solar heat collecting means disposed on the reflector to receive heat reflected therefrom, means for turning the reflector in a forward direction about an axis so that it follows the sun in its travel across the sky including a stepping motor, means connecting the motor to the reflector to rotate the latter about said axis, means responsive to successive heat-responsive elements for controlling the motor to drive the reflector forwardly in respective successive steps so that it generally follows the sun in its travel, means for automatically returning the collector to its starting, morning position when the temperature of the collector exceeds a predetermined value, the solar heat collecting means including tubing made of heat conducting material, means for introducing a heat collecting liquid into the tubing and exhausting it therefrom, means for automatically emptying the tubing of liquid when the temperature of the liquid in the tubing falls below a predetermined value, and means for de-energizing the means for turning the collector when the temperature of the liquid in the tubing falls below a predetermined value.

2. In combination, a solar tracing sensor comprising a support mounted to have successive zones thereof facing the sun in its travel across the sky during the day, and a plurality of similar heat-responsive elements mounted on the support in angularly spaced relationship so that successive elements during the day are the most highly heated by the sun during successive predetermined time periods, and a dirigible solar heat collector controlled by the solar tracking sensor, comprising a reflector having a reflecting side, means mounting the reflector so that its reflecting side faces the sun, solar heat collecting means disposed on the reflector to receive heat reflected therefrom, means for turning the reflector in a forward direction about an axis so that it follows the sun in its travel across the sky including a stepping motor, means connecting the motor to the reflector to rotate the latter about said axis, means responsive to successive heat-responsive elements for controlling the motor to drive the reflector forwardly in respective successive steps so that it generally follows the sun in its travel, means for automatically returning the collector to its starting, morning position when the temperature of the collector exceeds a predetermined value, solar heat collecting means includes liquid conducting means and comprising means for introducing a heat collecting liquid into the liquid conducting means and exhausing it therefrom, means for automatically emptying the liquid conducting means of liquid when the temperature of the liquid therein falls below a predetermined value, and means for deenergizing the means for turning the collector when the temperature of the liquid in the liquid conducting means falls below a pre-determined value.

3. In combination, a solar tracking sensor comprising a support mounted to have successive zones thereof facing the sun in its travel across the sky during the day, and a plurality of similar heat-responsive elements mounted on the support in angularly spaced relationship so that successive elements during the day are the most highly heated by the sun during successive predetermined time periods, and a rotatable solar heat collector the rotation of which is controlled by the solar tracking sensor, comprising a reflector having a reflecting side, means mounting the reflector so that its reflecting side faces the sun, solar heat collecting means disposed on the reflector to receive heat reflected therefrom, means for turning the reflector in a forward direction about an axis so that it follows the sun in its travel across the sky including an electric stepping motor, means connecting the motor to the reflector to rotate the latter about said axis, and means responsive to successive heat-responsive elements for controlling the motor to drive the reflector forwardly in respective successive steps so that it generally follows the sun in its travel, the means to drive the reflector forwardly in successive steps comprising a wheatstone's bridge circuit having a loop which includes the winding of a potentiometer and a plurality of similar series connected resistors, the potentiometer having a contactor which divides the winding into branches and, is movable relative to the winding means drivingly connecting the collector and the potentiometer so that the resistnaces of the branches of the potentiometer change in mutually opposite directions as a function of the angular degree of turning of the collector, a source of electric current, circuit means for connecting one side of the current source to the contactor of the potentiometer, circuit means operated by the respective heat-responsive elements in sequence to connect the other side of the current source to a first end of the series connected resistors, to junctions between successive ones of the resistors, and to the second end of the series connected resistors, and means responsive to unbalance of the bridge to energize the motor to drive the collector forwardly in said respective successive steps.

4. The combination according to claim 3, wherein the means responsive to unbalance of the bridge is a current differential relay connected across the bridge.

5. The combination of claim 3, wherein the means operated by the respective heat-responsive elements to connect the other side of the current source in sequence to the first end of the series connected resistors, the junctions between successive ones of the series connected resistors, and to the second end of the series connected resistors comprises a plurality of relays, each relay being responsive to its respective heat-responsive element of the solar tracking sensor.

6. The combination according to claim 3, comprising means for automatically returning the collector to its starting, morning position when the temperature of the collector exceeds a predetermined value, and means for returning the collector to the position thereof dictated by the sensor when the temperature of the collector, after having exceeded said predetermined value, thereafter falls below said predetermined value.

7. The combination according to claim 3, wherein the heat collecting means has a liquid receiving space therewithin and comprising means for introducing a heat collecting liquid into the space within the heat collecting means and exhausting it therefrom, and means for automatically emptying the said space of liquid when the temperatures of the liquid in said space falls below a predetermined value.

8. A solar heat collector according to claim 3, wherein the reflector is parabolic in section.

9. A solar heat collector according to claim 8, comprising a section of finned tubing connected in circuit with the tubing on the surface of the reflector, the finned tubing extending outwardly of the inner surface of the reflector generally along the optical axis of the reflector.

10. The combination according to claim 3, wherein the collector includes liquid conducting means disposed on the reflecting side of the reflector in heat transmitting relationship therewith and comprising means for introducing a heat collecting liquid into the liquid conducting means and exhausting it therefrom, and means for automatically emptying the liquid conducting means of liquid when the temperature of the liquid therein falls below a predetermined value.

11. The combination of claim 1, wherein the liquid conducting solar heat collecting means includes tubular liquid conducting means disposed on the reflecting side of the reflector in heat transmitting relationship therewith.

12. The combination according to claim 3, comprising a liquid space heating system, and means for selectively connecting the domestic hot water system and the liquid space heating system to the collector so that at least a portion of the space heating requirements are supplied by the collector.

* * * * *